Dec. 22, 1942.　　　D. J. McNEIL　　　2,305,630
LOGGING EQUIPMENT
Filed May 24, 1941　　　5 Sheets-Sheet 1

Inventor:
Donald J. McNeil.
By McCaleb, Hundt and Dickinson,
Attorneys.

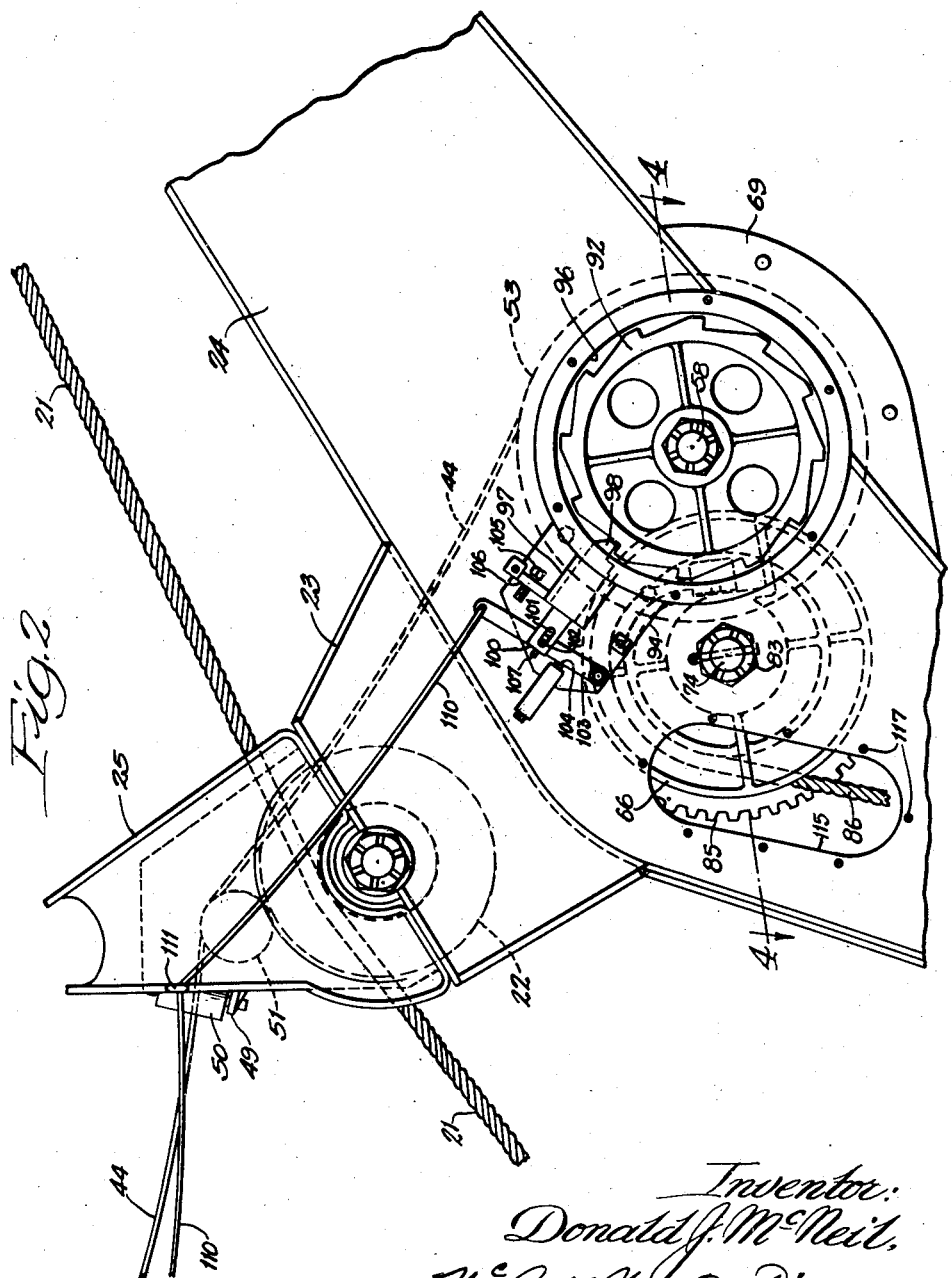

Dec. 22, 1942.　　　D. J. McNEIL　　　2,305,630
LOGGING EQUIPMENT
Filed May 24, 1941　　　5 Sheets-Sheet 3
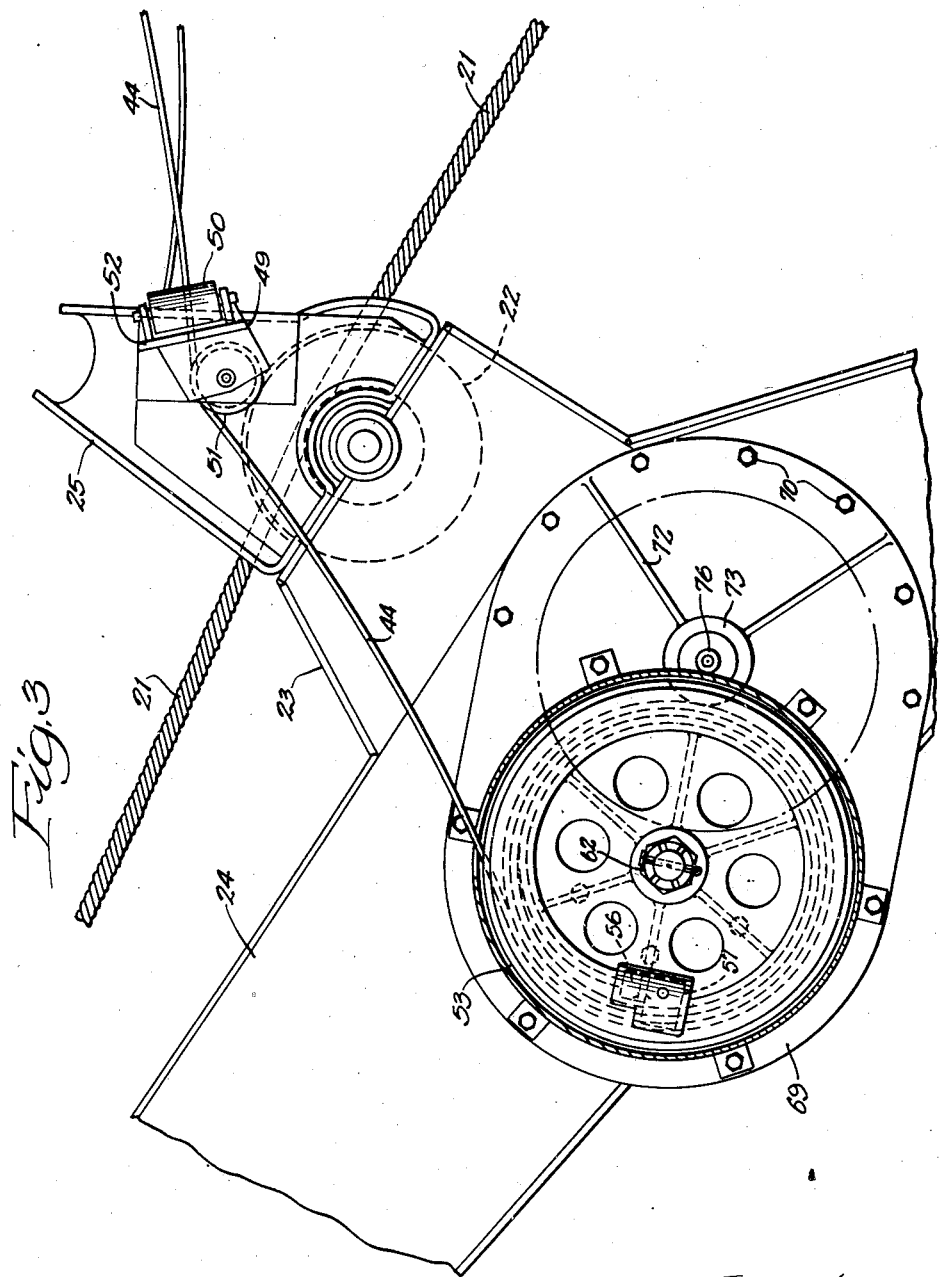
Inventor:
Donald J. McNeil.
By McCaleb, Wendt and Dickinson
Attorneys.

Dec. 22, 1942.   D. J. McNEIL   2,305,630
LOGGING EQUIPMENT
Filed May 24, 1941   5 Sheets-Sheet 4
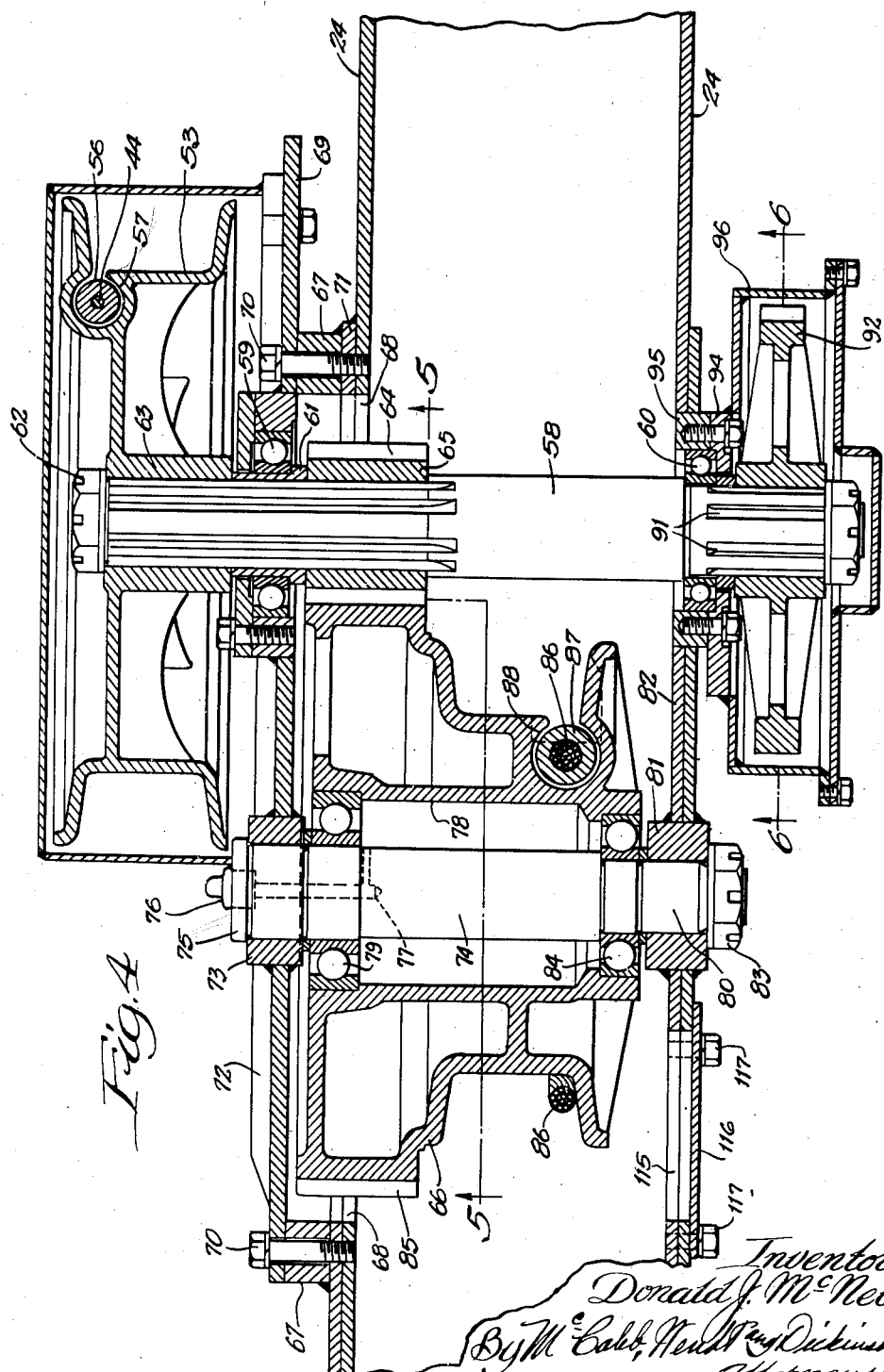
Inventor:
Donald J. McNeil,
By McCabb, Hewitt & Dickinson
Attorneys.

Dec. 22, 1942.                D. J. McNEIL                2,305,630
                            LOGGING EQUIPMENT
               Filed May 24, 1941            5 Sheets-Sheet 5
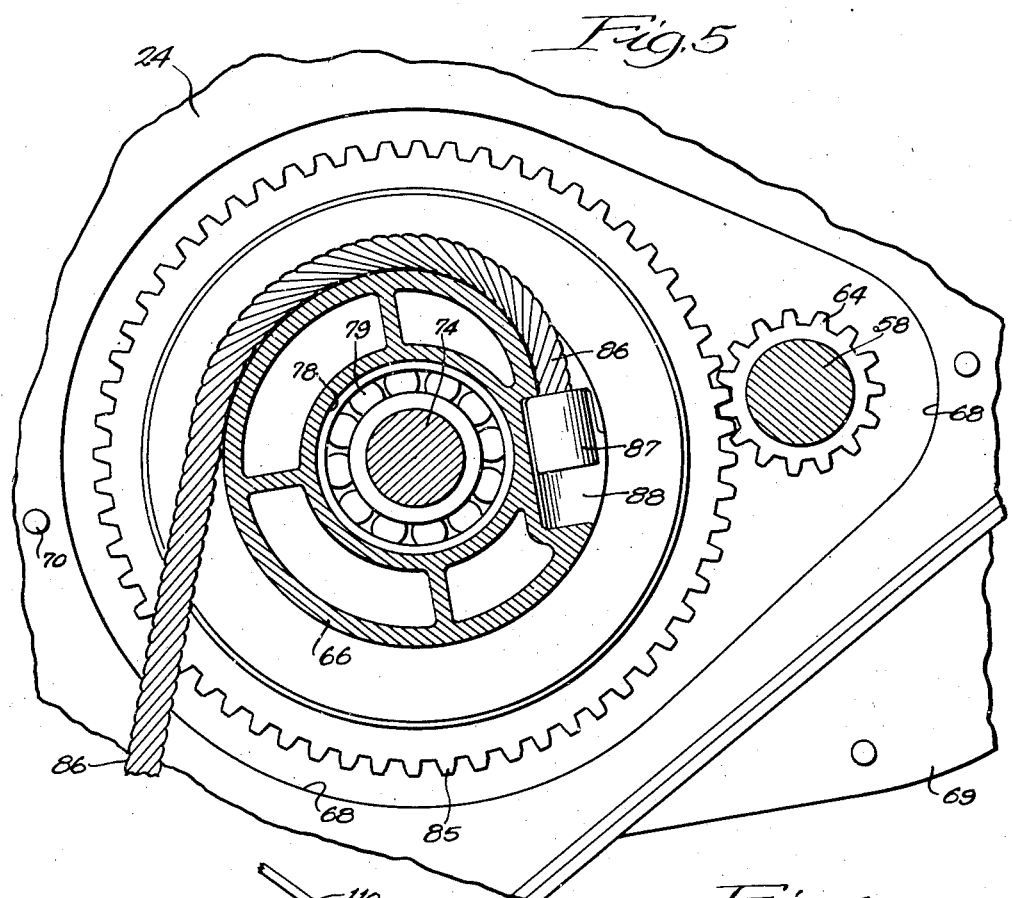
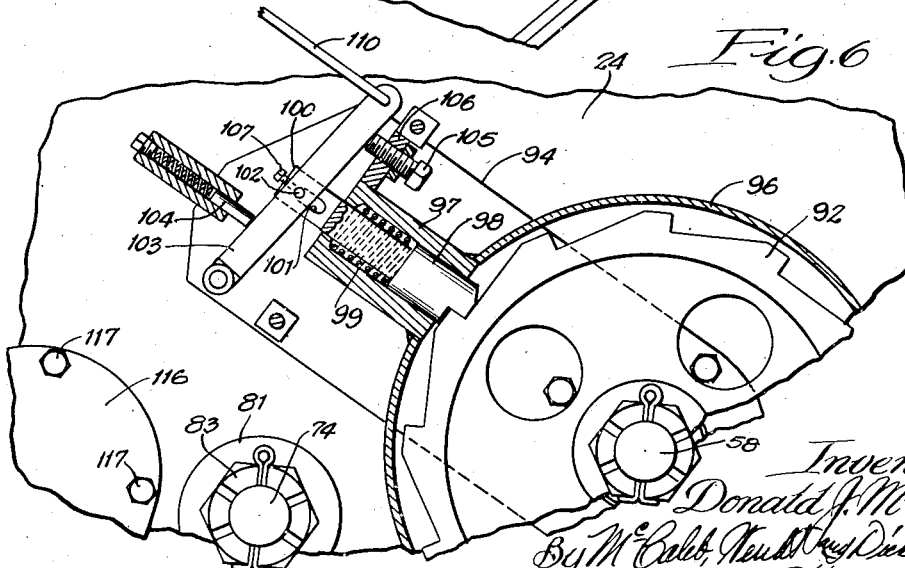

Patented Dec. 22, 1942

2,305,630

UNITED STATES PATENT OFFICE 2,305,630

LOGGING EQUIPMENT

Donald John McNeil, Portland, Oreg., assignor to Willamette Hyster Company, Portland, Oreg., a corporation of Oregon Application May 24, 1941, Serial No. 395,081

14 Claims. (Cl. 214—65.3)

My invention contemplates and provides certain improvements in tractor-and-fairlead-trailer logging equipments.

A tractor-and-fairlead-trailer logging equipment, as today commonly and widely used in the Pacific Northwest and elsewhere, has at its essentials: (a) a tractor of the track laying or crawler type; (b) a trailer (hitched to the tractor) having a pair of spaced-apart wheels of the crawler type; (c) a fairlead carried at a high point on and to the rear of the trailer; (d) a winch or hoist carried by the tractor, and (e) a line (usually in the nature of a more or less flexable cable) extending from the winch to, through and beyond the fairlead for attachment to a "pay load" in the form of one or more logs.

On the indrawing of the line, pursuant to appropriate operation of the tractor winch, the pay load is moved toward the trailer. If the pay load consists of a plurality of logs, they are automatically "bunched," and finally the pay load has its front end uplifted, for transportation, to a position somewhat lower than the fairlead. Nowadays it is common practice (1) to have the fairlead carried at the high rear end of an upwardly and rearwardly inclined boom, (2) to have the lower front end of the boom hitched to the trailer at a point which is at a distance above the ground closely approximating the distance above the ground of the axes of the tractor and trailer wheels, (3) to have the boom supported on and by the wheels through the agency of an arch and a tongue which conveniently are of generally wish-bone shape, and (4) to have the tractor winch located more or less directly above the aforesaid hitch between tractor and trailer.

One of the very important objects of my present invention is to provide such a tractor-and-fairlead-trailer equipment and more particularly a trailer unit thereof, with pay load supporting and towing means so arranged and coordinated as to increase, or maximize, the degree to which the weight of the tractor is made effective in producing crawling traction between the ground and the endless treads or wheel tracks of such tractor. Such object, stated in another way, is to minimize the extent to which the pay load, acting through the trailer, is permitted to exert upon the tractor lifting forces which impair its tractive efficiency.

Another important object of my present invention is to have the pay load supporting means, functioning as related in the last preceding paragraph, in the nature of a harness comprising a pair of cooperating lines, one of such lines acting between the pay load and a relatively high point on the trailer, and the other line acting between the pay load and a relatively low point on the trailer; each of said lines being capable of having its effective length modified when necessary or desirable.

Novel and important features of my invention, as incorporated in a preferred embodiment herein illustrated and described, are:

(a) Each of the two pay load controlling lines is operatively associated with its own winch,—each such winch deriving its power from the tractor power plant.

(b) One of the two pay load controlling lines extends from its individual winch to the pay load through the usual fairlead carried at the upper rear end of the trailer boom; the other of said lines being extended from its appropriate winch through an appropriate pulley located at a low point on the trailer, e. g., at or near the low front end of the boom.

(c) The pay load controlling line which extends through the high fairlead having power, from the tractor engine, applied thereto through the agency of a winch located at the rear end of the tractor; the other of such pay load controlling lines having tractor engine power applied thereto through the agency of a hoist located at the front end of the tractor.

(d) The pay load controlling line which extends through the high fairlead being directly connected, in the usual manner, with the winch on the rear end of the tractor; the other of said pay load controlling lines being connected through a "relay winch" with the hoist on the front end of the tractor.

(e) The relay winch being appropriately mounted on the front end of the trailer, e. g., in and on the front end of the boom.

(f) The relay winch being releasable at will from the driver's station on the tractor.

These and other features, objects and advantages of my invention will appear from the following detailed description, wherein reference is made to the accompanying drawings.

Referring to the drawings, of which there are five sheets:

Fig. 2 is an enlarged fragmentary elevational view of a portion of the trailer illustrated in Fig. 1 with a ratchet cover removed to show a ratchet and pawl arrangement, and with an inspection plate removed;

Fig. 3 is an enlarged fragmentary elevational view showing the opposite side of the portion of the trailer illustrated in Fig. 2;

Fig. 4 is a further enlarged fragmentary view showing a section taken on the plane of the line 4—4 of Fig. 3;

Fig. 5 is a fragmentary sectional view taken on the offset planes of the broken line 5—5 of Fig. 4; and, Fig. 6 is an enlarged fragmentary sectional view taken as on the plane of the line 6—6 of Fig. 4, and showing a ratchet wheel and pawl mechanism.

Figure 1:
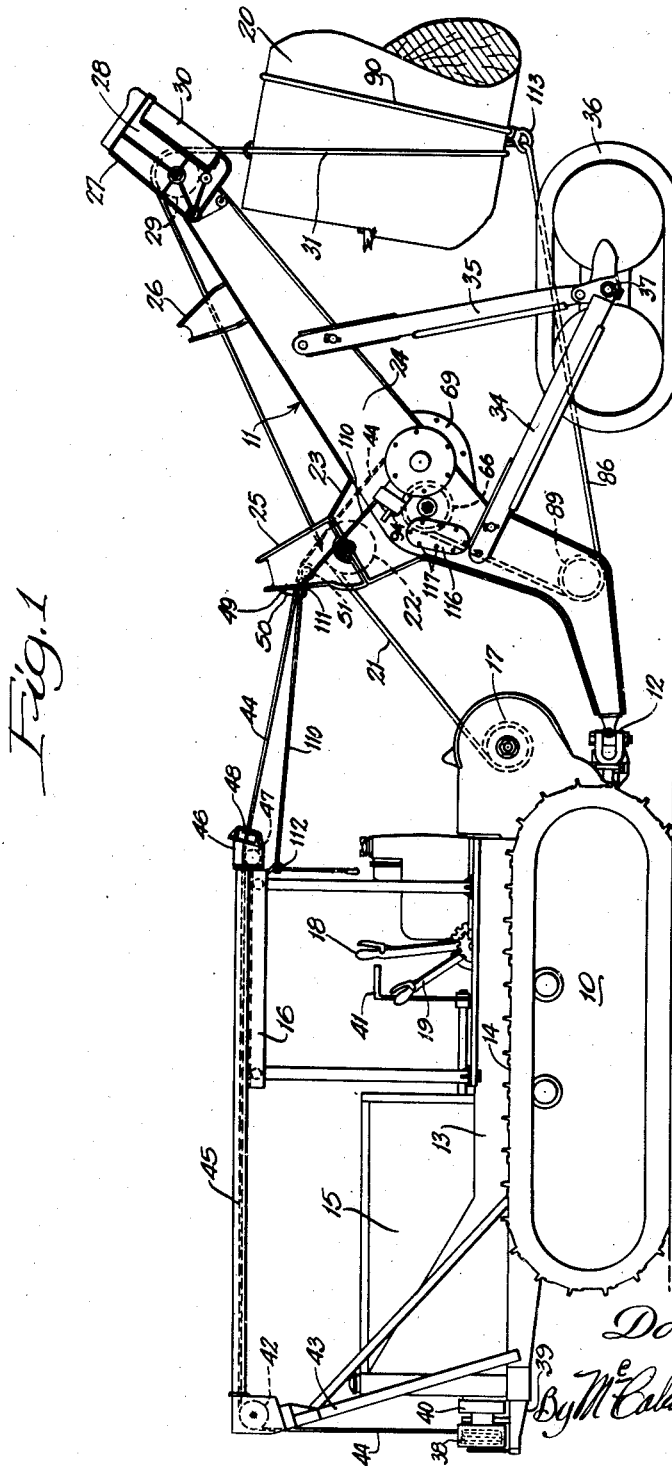
Fig. 1 is a view in side elevation of a tractor-and-fairlead-trailer equipment embodying the present invention, the forward end of a log supported by the trailer being illustrated.

Referring to the drawings in detail, the numeral 10 indicates generally a tractor of the track laying type, and the numeral 11 indicates generally a logging arch or fairlead-trailer. The tractor is connected to the trailer by hitch 12. The tractor comprises the conventional principal parts including a body 13, tracks 14, engine compartment 15, and an overhead shield or canopy 16. For the purpose of simplifying the drawings, the conventional tractor controls have not been illustrated.

A power winch 17 is mounted on the tractor frame, and is arranged to be driven in conventional manner by drive mechanism, not illustrated, from the rear power take-off of the tractor. Winch control levers 18 and 19 are arranged to manipulate the winch 17 in such manner that the winch can be positively driven in either direction or may be locked against paying out line. Locked, as just explained, the winch acts to support a pay load, such as log 20, in the position shown, through the agency of line 21.

Line or cable 21 extends from the drum of the winch 17 over a reaction roller 22, which is journaled in a bracket 23, carried by a boom 24. A line guard 25 is mounted over the roller 22 to prevent the line 21 from being pushed aside in case of encounter with branches or other obstructions, while passing through the woods, and also to check the whip of the line in case of its breakage.

A line guard 26 is also provided near the rear or upper end of the boom 24, and a fair lead 27 is secured in position in the extreme rear upper portion of the boom.

The fair lead 27 comprises a frame 28, which is preferably a steel casting, with a roller 29 journaled with its axis in a horizontal position, and a pair of smaller rollers 30 journaled with their axes in upright planes, mounted rearwardly of the horizontal roller 29.

The outer or free end of the line 21 is provided with a conventional choker 31 to encircle and engage a load such as the log 20.

The boom 24 is connected by tongue 34 and arch 35 with the usual pair of track laying wheels of which one only is indicated at 36. Each track laying wheel is journaled to the tongue as at 37, and the tongue connects with the boom somewhat near its forward or lower end. The lower ends of the arch are articulated with the tongue at points above and immediately adjacent the axes of trunnions 37, the upper portion of the arch being attached to the boom well to the front of the fairlead.

The equipment as described up to this point is or may be substantially conventional.

The illustrated equipment includes a relatively light power hoist 38, mounted on a bracket 39 on the front of the tractor 10, and adapted to be driven through conventional drive means, not illustrated, from the front power take-off of the tractor engine.

The hoist 38 is provided with a suitable clutch 40 controlled by an operating handle 41 placed conveniently to the operator.

An idler pulley 42 is mounted on a framework 43 carried by the tractor body 13, and a light line 44 is arranged to run from the drum of the hoist 38 over the idler pulley 42, and thence rearwardly through a tube 45, and through a fairlead 46 mounted on the rear of the shield or canopy 16. In practice a three-eighths inch flexible stranded cable has proved to be suitable for use as the line 44. The fairlead 46 includes a roller 47 mounted with its axis horizontal, and a pair of spaced apart rollers 48 mounted with their axes in substantially upright planes.

From the fairlead 46 the cable 44 extends rearwardly and through a second three roller fairlead 49 mounted on the guard 25, as best illustrated in Fig. 3. The fair lead 49 comprises a pair of substantially upright rollers 50, and a horizontal roller 51 mounted in a fabricated steel bracket 52. From the fairlead 49 the line 44 passes obliquely downwardly and is wound on a reel 53. The line 44 is secured to the reel 53 as by means of a sheath clamp 56 applied to the end of the cable and inserted in a recess 57, see Figs. 3 and 4, provided in the hub of the reel to receive the sheath.

The reel 53 has splined connection with a shaft 58 which is journaled in ball bearings 59 and 60 carried by the side plates of the boom 24. The inner race of the bearing 59 is mounted on a collar 61 which is fitted onto the splined shaft 58, this collar 61 being provided to transmit the thrust of a nut 62 through the hub 63 of the reel 53, thence through the collar 61 to a pinion 64, which is splined to the shaft 58, and fits against a shouldered offset 65 in the splines of the shaft 58.

A widened offset in a side plate 71 of the boom 24 to receive a toothed drum 66 is provided by means of a ring 67, which is welded in position around the edge of an opening 68 in the side plate 71 of the boom. A cover plate 69 is secured in position over the ring 67 by means of cap screws 70, which are positioned at fairly close intervals about the ring 67, and are arranged to have threaded engagement with the side plate 71 of the boom.

The cover plate 69 is preferably reinforced for stiffness by means of a plurality of ribs 72, see Figs. 3 and 4, which, in the welded fabricated structure illustrated, abut at their inner ends against a hug ring 73 which is also welded to the plate 69.

A shaft 74 is mounted in the hub ring 73 to have a close fit therein, one end of the shaft 74 being formed with an enlarged head portion 75 to contact the outer face of the hub ring 73.

A grease fitting 76 communicates with a grease passage 77 through which grease may be forced into the hollow hub 78 of the toothed drum 66. The inner race of a ball bearing 79 has a press fit on the shaft 74, the outer race of the bearing being mounted in a groove in the end of the hub 78. The other end of the shaft 74, i. e., the end away from the enlarged head 75, is reduced in diameter as at 80, and is inserted in a boss 81 welded in an opening in the side plate 82 of the boom, and is secured in position therein by means of a nut 83. A ball bearing 84 has its inner race pressed onto the shaft 74, the outer race thereof being inserted in a groove in the hub 78.

The drum 66 is provided with a ring of teeth 85 which are in toothed engagement with the teeth of the pinion 64 so that when the shaft 58 is rotated by the drawing of the cable 44 from the reel 53, by means of the front hoist 38, the toothed drum 66 will be powerfully rotated due to the reduction gearing provided in the pinion 64 and the ring of teeth 65.

The amount of line 86 carried by the drum 66 is relatively small as compared to the capacity of the winch 17, but such capacity is adequate for the purpose intended since the drum 66 is required to operate through relatively short distances, such as in drawing the load to a proper towing position as in Fig. 1, after the load has been brought in close by the line 21.

The line 86 has a ferrule 87 secured to an end thereof, the ferrule being secured in a recess 88, see Figs. 4 and 5, in the drum 66. An opening 115 is provided in the boom side plate 82 for service and inspection of the line 86 and the drum 66, and is provided with a removable cover plate 116 which is secured in position by bolts 117.

From the drum 66 the line 86 passes downwardly, see Fig. 1, and around a deflecting roller 89 journaled between the sides of the boom. This roller 89 serves to deflect the line 86 to a plane substantially level with the hitch 12. From the deflecting roller 89, the line 86 passes rearwardly through an opening, not illustrated, in the rear face of the boom, the line 86 being provided at its outer or free end with a conventional choker 90.

The end of the shaft 58, opposite to that carrying the reel 53, is splined as at 91, see Fig. 4, and has a splined ratchet wheel 92 mounted thereon and secured in position by means of a nut 93. A pawl mounting plate 94, see Figs. 2, 4 and 6, is bolted to a bearing support ring 95, and has a housing 96 welded thereto to form a protective cover over the ratchet wheel 92. A pawl support cylinder 97 is welded to the support plate 94 and to the guard 96, and has a pawl 98 slidably mounted therein, the inner end of the pawl being adapted to engage the teeth of the ratchet wheel 92 as best illustrated in Fig. 6.

A coil spring 99 is held in compression between the end of the cylinder 97 and a shoulder on the pawl 98, to press the pawl downwardly into engagement with one of the teeth of the ratchet 92. The outer end of the pawl 98 is flattened as at 100, and is provided with a slotted opening 101 in which rides a stud 102 carried by a pawl release lever 103.

The pawl release lever 103 is pivoted on the mounting plate 94, and is urged by a spring pressed plunger 104 normally to hold the lever 103 in an unoperated position to permit the spring 99 to hold the pawl 98 in latched engagement with one of the teeth of the ratchet wheel 92.

An adjusting screw 105 is threaded in a support 106 welded to the support plate 94. The adjusting screw 105 is positioned to engage the lever 103 and to limit its movement under the spring pressure of the plunger 104. A second adjusting screw 107 is threaded into the end of the pawl 98, and is adapted to project into the slotted opening 101 to limit the movement of the pawl 98.

A lanyard 110 is connected to the free end of the pawl release lever 103 and passes through an eye 111 on the cable guard 25, and thence through an eye 112 to a position adjacent the operator, see Fig. 1.

When a pay load has been transported to its desination, it is lowered just before the tractor-and-fairlead-trailer equipment comes to rest, by releasing the winch 17 and hoist 38 to free running condition. As the equipment moves ahead a short distance with the winch 17 and hoist 38 thus released, the lines 21 through the fairlead, and 86 around the reaction roller 89, are withdrawn to extend behind the trailer. The lines 21 and 86 then may be released from the pay load, whereupon the equipment is ready for a return trip.

The lines 21 and 86 preferably are permitted to drag behind the trailer in this partially withdrawn condition on the return trip. This procedure has the extremely desirable result of providing for engagement of the line 86 with a subsequent pay load without manipulation of the drum 66. The winch 17 and drum 66 are secured by their respective ratchets on the return trip to prevent further unwinding of the lines 21 and 86.

The dragging of the lines on the return trip is not objectionable since the line wear occasioned thereby is negligible, and there is little likelihood of the lines becoming snagged in passing through ordinary logging country.

In case it should be necessary or desirable to disconnect the tractor 10 from the trailer 11, the line 44 can be unwound entirely from the reel 53 by means of the hoist 38, whereupon the ferrule 56 can be removed from the recess 57 to disconnect the line 44 from the reel 53. The rest of the line 44 then may be wound onto the hoist 38. The lanyard 110 may be released from the eye 112, and the line 21 wound completely onto the winch 17.

By disconnecting the hitch 12, the tractor 10 is thereupon completely separated from the trailer 11.

In the operation of the equipment, the load to be transported, which may be either a single large log such as the log 20 illustrated in Fig. 1, or a plurality of smaller logs, is lifted at least partially into a load carrying position by means of the winch 17, which operates the line 21 through the fairlead 27 to draw in and raise the load 20 by means of the choker 31 which engages the load in well known manner.

Either before or after the load is raised to the carrying position as illustrated in Fig. 1, the choker 90, attached to the line 86, is placed around the load 20. The line 86 is then drawn in as desired by rotation of the drum 66, through the action of the reel 53.

The reel 53 has the light line 44 wound thereon in comparatively large quantities, and when such line is wound onto the relatively light forward hoist 38, by means of the front power take-off previously mentioned, the reel 53 is actuated to operate drum 56 with great mechanical advantage.

When the line 86 is drawn in by action of the drum 66 and associated parts as above described, the spring pressed pawl 98 engages the ratchet wheel 92. This ratchet wheel, being splined to the shaft 58, securely holds the drum 66 against counter-rotation by means of the splined pinion 64. After the line 86 is drawn in to its required position, and secured by the pawl 98, the light cable 44 may be slacked off slightly, as by releasing the drum of the front take-up winch 38. This permits the cable 44 to pay out and sag slightly between the fair leads 46 and 49, and thereby permits free articulation at the hitch 12, when the apparatus travels over rough terrain.

It will be noted, Fig. 1, that the line-of-draft from the hitch 12 to the point of application to the load at the eye 119 of the choker 90, is substantially a straight line, and is but little higher at the eye than at the hitch. Frequently it is unnecessary to raise the load as high as the position of Fig. 1, which may be considered as an extreme illustration of the height at which the towing line 86 is attached to the load.

Therefore, any increase in drag stresses such as might be caused by the load encountering obstructions when moving over rough ground, does not tend to lift the tractor to any noticeable or material extent. For all practical purposes, the full tractive effect of the tractor is thus made available even under the most severe hauling conditions.

It is apparent from Fig. 1 that a major portion of the weight of the trailer 11 is located forwardly of a vertical plane through the trailer trunnions 37. This assists in counter-balancing the weight of the load 20, which tends to raise the rear of the tractor, particularly since the weight of the load 20 acts through a short leverage with respect to its fulcrum, the trunnions 37.

The line 21 enters the drum of the winch 17 above the hitch 12, and exerts a lifting force forwardly at the hitch 12, tending to raise the front end of the tractor, due to the reaction-wheel principle of the roller 22. These two forces, therefore, counter-balance each other, at least to a degree well within the practical limits allowed by the great weight of the tractor itself.

The drag or horizontal stresses are carried entirely by the line 86, and the tractor is thus assured of adequate tractive effect irrespective of the nature of the terrain being traversed, or of any unusual increase in drag resistance by the load.

My invention can be readily embodied in existing types of logging trailers, and greatly increases the effectiveness of such equipment, particularly when operating over difficult terrain. In practice it has been found possible to proceed directly through rough mountainous country without stopping or releasing the load under conditions, which, without my present invention, would have been impossible.

The use of my invention on a logging trailer tends to eliminate any jack-knifing tendency between the tractor and the trailer, and resolves the lifting and the drag stresses into their respective components to prevent the variable drag components from reducing the tractive effect of the tractor.

While I have illustrated a preferred embodiment of my invention, many modifications may be made without departing from the spirit of the invention, and I do not wish to be limited to the precise details of construction as set forth, but desire to avail myself of all changes within the scope of the appended claims.

Having thus described my invention, what I claim as new and desire to secure by Letters Patent of the United States is:

1. In a logging transport including a tractor, a trailer, an inclined boom having a high rear end joined to the tractor at its lower front end and axially supported on the trailer: a winch upon the end of said tractor, a second winch upon said boom, load hoisting means actuated by said first winch, load towing means actuated by said second winch, and a reaction point for each of said means, located at the upper end and at the lower end, respectively, of said boom, so to distribute the forces due to the weight and the drag of the load respectively, that only the weight of the load will cause the boom to have a moment around the trailer axis tending to decrease the effective weight of the tractor, but so that the drag reaction of the load will pass substantially through the mounting axis of the boom.

2. In a trailer to be drawn by a tractor in a logging transport, the combination with laterally separated ground supports, a load-carrying connection between and pivoted on said supports, a high fairlead on the load-carrying connection rearwardly of a vertical transverse plane through the pivotal connection between the load-carrying connection and the ground supports, and a winch operated line leading out through the high fairlead, of a drag line mounting carried by the load-carrying connection materially below and ahead of the fairlead, and a line adjustably connected to said line mounting for transmitting drag stresses to the trailer materially below a horizontal plane through the fairlead during a load hauling movement of the transport.

3. A trailer to be coupled to the rear end of a power-winch-carrying tractor to form a logging transport, the trailer having separated ground supports, a load carrying connection between and pivoted on said supports, a high fairlead on the load carrying connection, rearwardly of a vertical transverse plane through the pivotal connection between the load carrying connection and the ground supports, and a line to lead from the winch through the fairlead; of a winding drum mounted on the load carrying connection below the fairlead, a line deflector mounted on the load carrying connection below the winding drum, a line from the winding drum around the deflector, force-multiplying means in driving connection with the winding drum, and means for locking the winding drum in position.

4. In a logging transport, the combination with a tractor, a trailer having separated ground supports, a load carrying connection between, and pivoted on, said supports, a winch on the tractor, means for driving the winch, a high fairlead on the load carrying connection, and a line leading from the winch through the fairlead; of a winding drum rotatably mounted on the load carrying connection below the fairlead, a line leading from the winding drum at a low point of the trailer and adapted to be secured to a load, force-multiplying means in driving connection with the winding drum, a reel mounted to drive the force-multiplying means, power driven, relatively light, line take-up means on the tractor, a relatively light line leading from said take-up means to said reel, and releasable lock means mounted to lock the winding drum through the force-multiplying means.

5. In a logging transport, the combination with a tractor, a trailer having separated ground supports, a load carrying connection between, and pivoted on, said supports, a winch on the tractor, means for driving the winch, a high fairlead on the load carrying connection, and a line leading from the winch through the fairlead; of a winding drum rotatably mounted on the load carrying connection, a line deflector on the load carrying connection below the winding drum, a line leading from the winding drum around the line deflector, force-multiplying means in driving connection with the winding drum, a reel mounted to drive the reduction gearing, line take-up means mounted on the tractor, to have a power driven condition and a free running condition, a line leading from the reel to the take-up means, and an elevated idler mounted on the tractor to support the last mentioned line in elevated position between the take-up means and the reel.

6. In a logging trailer to be coupled at its forward end to the rear of a tractor to form a logging transport, and having laterally separated ground supports, a load-carrying connection between and pivoted on said supports, a high fairlead on the load-carrying connection, a winch operated line leading out from the fairlead to suspend a load in a partially raised position, the load creating combined elevational and drag stresses during a load hauling movement of the transport, the improvement which consists of a winch operated drag line extending rearwardly at a low level from a line deflector mounted at a low point on the trailer for connection at a low point to the load to carry the drag stresses, whereby to maintain the load in suspension directly beneath the high fairlead during a load hauling movement of the transport.

7. In a logging transport, the combination with a tractor, a trailer having separated ground supports, a load carrying connection between and pivoted on said supports, a high fairlead on the rear of the load carrying connection, and means for supports a load in partially raised position beneath said fairlead; of a drum carried by said load carrying connection, a line leading from said drum to a low point of a supported load, a line deflector mounted at a low point of said load carrying connection to deflect said line, and means for securing said line in an adjusted position around the line deflector, to transmit horizontal stresses generated in moving the load to the tractor in a low plane without substantial tilting effect on said trailer during a load hauling movement of the transport.

8. For combination with a tractor in a logging transport a trailer having separated ground supports, said vehicle having a hollow fabricated boom pivotally supported in upwardly and rearwardly inclined position between the ground supports, a fairlead mounted on a high part of the boom, and a line passing through the fairlead and adapted to support a load of logs in partially raised condition beneath the fairlead; of a winding drum mounted on the boom below the fairlead, locking means mounted to lock the drum in adjusted position, a cable deflector mounted on the boom below the drum, and a line leading from the drum and passing beneath the deflector, the line being adapted to be connected to a relatively low part of a load supported beneath the fairlead to transmit horizontal stresses generated in moving the load, to the tractor in a low plane without substantial lifting effect on said tractor.

9. For combination with a tractor in a logging transport, a trailer having separated ground supports, said trailer having a hollow fabricated boom pivotally supported in upward rearwardly inclined position between the ground supports, a fairlead mounted on a high part of the boom, and a line passing through the fairlead and adapted to support a load of logs in partially raised suspended condition beneath the fairlead, the load creating combined elevational and drag stresses during a transporting operation; of a second line connected to a low point on the load and to a low point on said trailer, said line being adjusted to a length to carry the drag stresses and thereby to maintain the load in substantially direct suspension beneath the fairlead, against the effect of drag stresses during a load hauling movement of the transport.

10. In a logging transport including a tractor having an engine, a winch on the end of the tractor operatively connected to the tractor engine, a relatively light hoist mounted on the tractor operatively connected to the tractor engine, a trailer, an inclined boom pivoted to the tractor at its lower end and supported over the trailer: a load hoisting line leading from the winch through a reaction point at the upper end of the boom to a load, and reacting downwardly at the reaction point to lessen the tractive effect of the tractor, a winding drum on the boom, a line leading from the winding drum to the load and reacting substantially horizontally in a line materially below the upper end of the boom, force-multiplying means operatively connected to the winding drum, and means connecting the light hoist on the tractor to the force-multiplying means to operate the winding drum with mechanical advantage.

11. In a logging transport including a tractor having an engine, a winch on the end of the tractor operatively connected to the tractor engine, a relatively light hoist mounted on the tractor operatively connected to the tractor engine, a trailer, an inclined boom pivoted to the tractor at its lower end and supported over the trailer: a load hoisting line leading from the winch through a reaction point at the upper end of the boom to a load, and reacting downwardly at the reaction point to lessen the tractive effect of the tractor, a winding drum on the boom, a line leading from the winding drum, through a reaction point at the lower end of the boom, to the load and reacting substantially horizontally between the reaction point and the load, force-multiplying means operatively connected to the winding drum, and means connecting the light hoist on the tractor to the force-multiplying means to operate the winding drum with mechanical advantage.

12. In a logging transport, the combination with a tractor, a trailer having separated ground supports, a load carrying connection between, and pivoted on, said supports, a winch on the tractor, means for driving the winch, a high fairlead on the load carrying connection, and a line leading from the winch through the fairlead; of a winding drum rotatably mounted on the load carrying connection below the fairlead, a line leading from the winding drum at a low point of the trailer, and adapted to be secured to a load, force-multiplying means in driving connection with the winding drum, a reel mounted to drive the force-multiplying means, power driven relatively light line take-up means on the tractor, a relatively light line leading from said take-up means to said reel, releasable lock means mounted to lock the winding drum through the force-multiplying means, and drive release means on the power driven relatively light line take-up means on the tractor to free the relatively light line between the tractor and the trailer with the winding drum in locked, line holding position, for free articulation between the tractor and trailer.

13. In a trailer to be coupled at its forward end to the rear of a tractor for logging transport and having a beam fulcrumed on laterally spaced supports rolling over the ground, with a low forward tractor coupling and a high rearward fairlead, and a winch operated line passing downwardly from the fairlead to suspend the forward end of the load during pay load travel of the transport, the improvement which comprises a winch operated drag line extending rearwardly from the trailer at low level for attachment to the load for bearing the main drag stress of the load substantially to free the suspending cable of the drag stress during pay load transport, whereby to lessen the tendency of load drag upon the suspending cable and fairlead to lock the trailer rearwardly about its fulcrum and thereby exert an upward push upon the rear of the tractor at the trailer hitch.

14. In a trailer vehicle to be coupled at its forward end to the rear of a tractor vehicle for logging transport and having a beam fulcrumed on laterally spaced supports rolling over the ground, with a low forward vehicle coupling and a high rearward fairlead, and a winch operated line passing downwardly from the fairlead to suspend the forward end of the load during pay load travel of the transport, the improvement which comprises a drag line extending forwardly at low level from attachment to the front of the load to attachment with structure on one of said vehicles, for bearing the main drag stresses of the load to relieve the suspending cable of drag stress during the pay load transport, whereby to lessen the tendency of load drag upon the suspending cable and fairlead to rock the beam rearwardly about its fulcrum and thereby exert an upward push upon the rear of the tractor vehicle at the coupling.

DONALD JOHN McNEIL.